US011207954B2

(12) United States Patent
Tsao et al.

(10) Patent No.: US 11,207,954 B2
(45) Date of Patent: Dec. 28, 2021

(54) HOOK ASSEMBLIES

(71) Applicants: Toyota Motor Engineering & Manufacturing North America, Inc., Plano, TX (US); NIFCO America Corporation, Canal Winchester, OH (US)

(72) Inventors: Robert Tsao, Ann Arbor, MI (US); Scott E. Malinowski, Brighton, MI (US); Clayton J. Karl, Grass Lake, MI (US); Philip J. Babian, Canton, MI (US); Benjamin D. Hack, Blacklick, OH (US)

(73) Assignees: Toyota Motor Engineering & Manufacturing North America, Inc., Plano, TX (US); NIFCO America Corporation, Canal Winchester, OH (US)

( * ) Notice: Subject to any disclaimer, the term of this patent is extended or adjusted under 35 U.S.C. 154(b) by 276 days.

(21) Appl. No.: 16/579,023

(22) Filed: Sep. 23, 2019

(65) Prior Publication Data

US 2021/0086592 A1    Mar. 25, 2021

(51) Int. Cl.
*B60J 3/02* (2006.01)

(52) U.S. Cl.
CPC ............. *B60J 3/0221* (2013.01); *B60J 3/023* (2013.01)

(58) Field of Classification Search
CPC ......... B60J 3/0221; B60J 1/2047; B60J 3/023
USPC ...................................................... 296/97.9
See application file for complete search history.

(56) References Cited

U.S. PATENT DOCUMENTS

| 6,368,009 | B1 * | 4/2002 | Noda ....................... B60J 3/023 |
|  |  |  | 403/329 |
| 6,398,295 | B2 | 6/2002 | Asai |
| 6,557,184 | B2 | 5/2003 | Gafforio |
| 7,438,341 | B1 | 10/2008 | Olson, Jr. |
| 7,967,266 | B2 | 6/2011 | Lesecq et al. |

(Continued)

FOREIGN PATENT DOCUMENTS

| CN | 104723848 B | 3/2017 |
| CN | 206287803 U | 6/2017 |
| KR | 101605557 B1 | 3/2016 |

OTHER PUBLICATIONS

"OTUAYAUTO 4 pcs Sun Shade Hook Sliding Door Clip Kit—fits Honda Odyssey 2005-2010—Replace OEM: 83715-SHJ-A21ZA"; Accessed/Published: Mar. 12, 2019; URL: https://www.amazon.com/OTUAYAUTO-4pcs-Shade-Hook-Sliding/dp/B07MKKC1S2.

*Primary Examiner* — Joseph D. Pape
(74) *Attorney, Agent, or Firm* — Dinsmore & Shohl LLP

(57) ABSTRACT

A hook assembly for mounting to a body component having a pair of openings is provided. The hook assembly includes a pin member and a hook housing. The pin member includes a base portion and a pair of insertion pins extending upwardly from the base portion. The hook housing includes a top surface and a pair of interior channels. A pair of clip prongs are positioned at each opening of the pair of interior channels. A hook member extends outwardly from the hook housing. The hook housing is coupled to the body component by inserting the pair of clip prongs into the openings formed in the body component in a clip prong insertion direction. The pair of insertion pins are inserted into the pair of interior channels in a pin insertion direction to secure the pin member and the hook housing to the body component.

15 Claims, 4 Drawing Sheets

(56) References Cited

U.S. PATENT DOCUMENTS 8,141,832 B2    3/2012  Chak
8,579,010 B2 *  11/2013  Medlar .................. B60J 1/2047
                                                        160/368.1

* cited by examiner

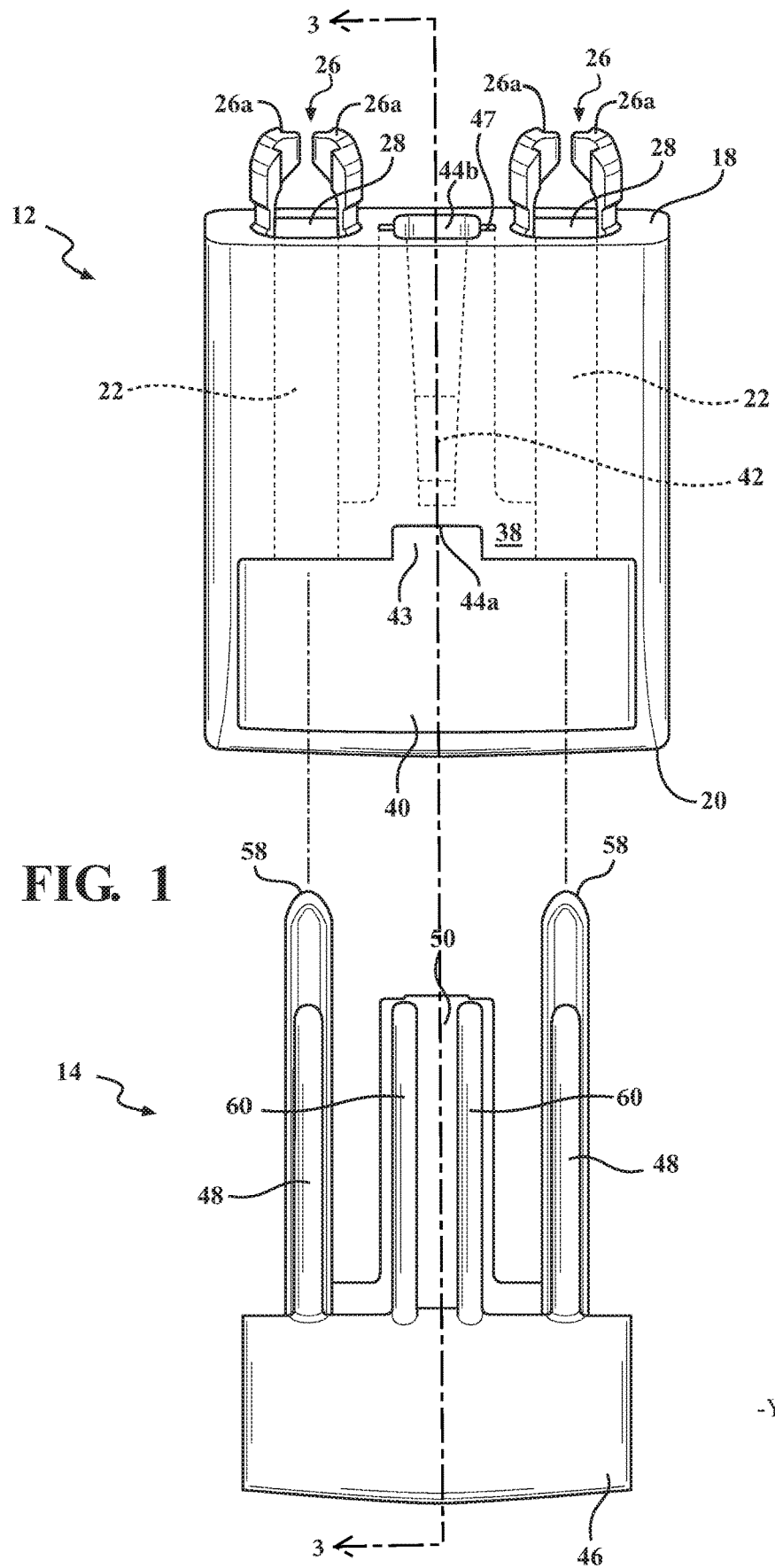
FIG. 1
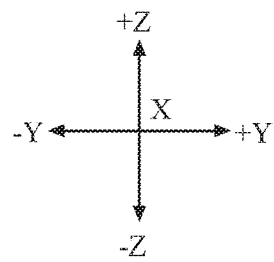

HOOK ASSEMBLIES

TECHNICAL FIELD

The present specification is related to a hook assembly and in particular to a hook assembly in which a clip prong insertion angle of a hook housing is different from a pin insertion angle of a pin insertion member.

BACKGROUND

It is known to provide vehicle windows with retractable sunshades that are retained in an extended position by a sunshade hook assembly. The previously known sunshade hook assemblies are a two part assembly that include a hook part and a pin part. The hook assembly are to be installed or attached into various underlying body members of the vehicle. As such, the hook part is aligned with mounting holes in the body members and the pin part is installed through the hook part into the openings of the mounting holes. The insertion direction of the hook part is parallel to the insertion direction of the pin part. However, assembly time and packaging constraints limit the availability of space for the mounting of the sunshade hook assembly to the underlying body member. Additionally, the hook part and/or the pin par may be misplaced, dropped, and the like before and/or during the installation into the underlying body member.

Accordingly, a need exists for a two-piece hook assembly that combines the two pieces in a combined pre-assembled position and allows for installation at an angle relative to the body member.

SUMMARY

A hook assembly for mounting to a body component having a pair of openings is provided. The hook assembly includes a pin member and a hook housing. The pin member includes a base portion and a pair of insertion pins extending upwardly from the base portion. The hook housing includes a top surface, an opposite bottom surface, and a pair of interior channels extending between openings formed in the top surface. Further, the hook housing includes an opening formed in the bottom surface. A pair of clip prongs are positioned at each opening of each one of the pair of interior channels at top surface of the hook housing. A hook member extends outwardly from the hook housing. The hook housing is coupled to the body component by inserting the pair of clip prongs into the openings formed in the body component in a clip prong insertion direction. The pair of insertion pins are inserted into the pair of interior channels in a pin insertion direction to secure the pin member and the hook housing to the body component. The pin insertion direction is different from the clip prong insertion direction.

A vehicle is provided. The vehicle includes a vehicle body component having a pair of openings, a retractable sunshade having an opening and configured to move to an extended position and a hook assembly configured for securing the retractable sunshade in the extended position. The hook assembly includes a hook housing and a pin member. The hook housing includes a top surface, an opposite bottom surface, and a plurality of interior channels extending between the top surface and the bottom surface. A pair of clip prongs are positioned at the opening of each one of the plurality of interior channels at the top surface of the hook housing. A snap tab positioned between the plurality of interior channels, and a hook extends outwardly from the hook housing to engage with the retractable sunshade. The pin member includes a base portion, a pair of insertion pins extending upwardly from the base portion, and a snap tab member provided between the pair of insertion pins. The hook assembly is secured to the vehicle body component by inserting the pair of clip prongs into the corresponding openings formed in the vehicle body component in a clip prong insertion direction. The pair of insertion pins are then inserted into each corresponding interior channel of the plurality of interior channels at a pin insertion direction such that the pair of clip prongs are pushed outwardly when the pin member is fully inserted into the hook housing such that a distal end of each insertion pin exits the opening of the respective interior channel and is positioned between the prongs of the respective pairs of clip prongs. The pair of clip prongs insertion direction is angled with respect to the pin insertion direction. The snap tab of the hook housing engages with the snap tab member of the pin member at a first positon to retain the pin member to the hook housing in an assembled state.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 schematically depicts an exploded view of a hook assembly, according to one or more embodiments shown or described herein;

DETAILED DESCRIPTION

Figure 2:
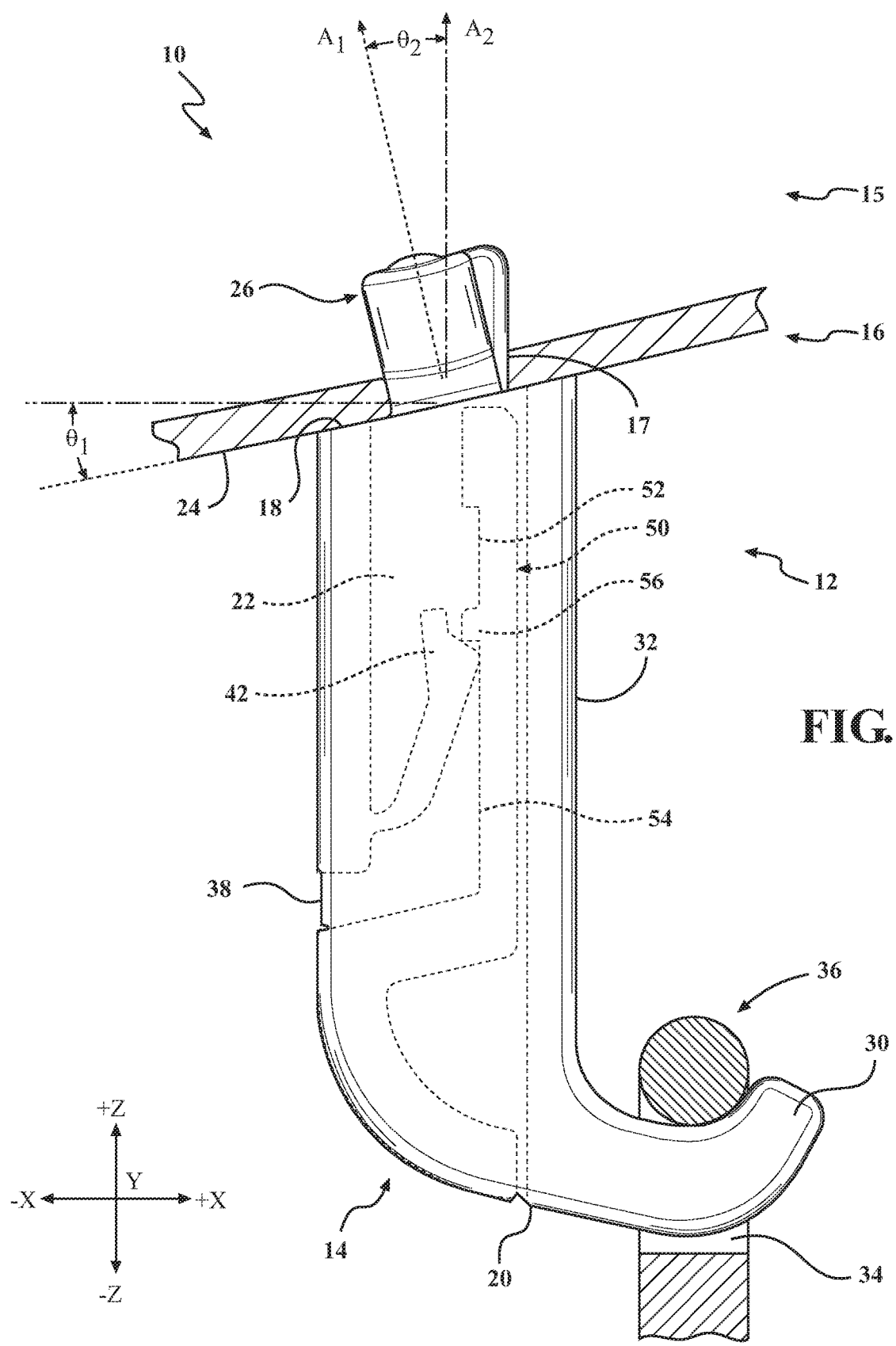
FIG. 2 schematically depicts a side environmental view of the hook assembly of FIG. 1 in an assembled state, according to one or more embodiments shown or described herein.

Embodiments described herein generally relate to a hook assembly for mounting to a body component having a pair of openings is provided. The hook assembly includes a pin member and a hook housing. The pin member includes a base portion and a pair of insertion pins extending upwardly from the base portion. The hook housing includes a top surface, an opposite bottom surface, and a pair of interior channels extending between openings formed in the top surface. Further, the hook housing includes an opening formed in the bottom surface. A pair of clip prongs are positioned at each opening of each one of the pair of interior channels at the top surface of the hook housing. A hook member extends outwardly from the hook housing. The hook housing is coupled to the body component by inserting the pair of clip prongs into the openings formed in the body component in a clip prong insertion direction. The pair of insertion pins are inserted into the pair of interior channels in a pin insertion direction to secure the pin member and the hook housing to the body component. The pin insertion direction is different from the clip prong insertion direction.

As used herein, the term "system longitudinal direction" refers to the forward-rearward direction of the system (i.e., in the +/−X direction of the coordinate axes). The term "system lateral direction" refers to the cross-direction (i.e., along the Y axis of the coordinate axes), and is transverse to the longitudinal direction. The term "system vertical direction" refers to the upward-downward direction of the system (i.e., in the +/−Z-direction of the coordinate axes). As used herein, "top" is defined as generally being towards the positive Z direction of the coordinate axes shown in the drawings. "Bottom" is defined as generally being towards the negative Z direction of the coordinate axes shown in the drawings.

Referring now to FIG. 1, a hook assembly 10 will now be described. The hook assembly 10 includes a hook housing 12 and a pin member 14 configured to be received and secured to the hook housing 12, as described in greater detail below. The hook housing 12 includes a top surface 18, an opposite bottom surface 20, a back surface 38 and an opposite front surface 32. The back surface 38 includes a cavity 40 configured to receive the pin member 14, as discussed in greater detail herein. A plurality of interior channels 22 extend between the each opening 28 and the bottom surface 20. In some embodiments, the plurality of interior channels 22 extend between each opening 28 and the cavity 40.

The hook housing 12 further includes two pair of clip prongs 26. Each pair of clip prongs 26 has a pair of prongs 26a positioned at either side of the opening 28 of each of the interior channels 22 at the top surface 18 of the hook housing 12. The pair of prongs 26a are positioned on either side of each opening 28 and are configured to flex or move in either the system lateral direction (i.e., in the +/−Y direction) and/or in the system longitudinal direction (i.e., in the +/−X direction) when an axial force in the system vertical direction (i.e., in the +/−Z direction) is applied to each pair of prongs 26a. The top surface 18 in angled with respect to the X-axis Referring to FIGS. 1 and 2, the hook housing 12 further includes a snap tab 42 provided between the plurality of interior channels 22. It should be appreciated that the snap tab 42 of the hook housing 12 is a resilient member that flexes in the system longitudinal direction (i.e. in the +/−X direction) when an axial force in the system vertical direction (i.e., in the +/−Z direction) is applied to the snap tab 42, such as when the pin member 14 including a snap tab member 50 is inserted into the hook housing 12, as discussed in greater detail herein.

In some embodiments, the hook housing 12 includes a snap tab member passage 43 that includes a snap tab member insert opening 44a positioned at the cavity 40 of the hook housing 12 and a snap tab member exit opening 44b positioned at the top surface 18 of the hook housing 12. The snap tab member passage 43 may include an elongated slot 47 extending therethrough and into the snap tab member exit opening 44b. In some embodiments, the elongated slot 47 extends through a midline of the snap tab member exit opening 44b.

A hook 30 extends outwardly from a front surface 32 of the hook housing 12. The hook 30 is configured to engage with an opening 34 of a retractable sunshade 36 to retain a retractable sunshade 36 in an extended position so as to cover a window opening of a vehicle 15.

The pin member 14 includes a base portion 46 and a pair of insertion pins 48 extending upwardly in the system vertical direction (i.e., in the +/−Z direction) from the base portion 46. It should be appreciated that each of the pair of insertion pins 48 includes a distal end 58. The pair of insertion pins 48 extend in the system vertical direction (i.e., in the +/−Z-direction) beyond the opening 28 of the hook housing 12 when the pin member 14 is seated into the cavity 40 of the hook housing 12 in an assembled state, as discussed in greater detail herein.

Further, in some embodiments, the distal end 58 of the pair of insertion pins 48 is rounded. In other embodiments, the distal end 58 may be any shape, such as square, spherical, octagon, and the like. In some embodiments, the pair of insertion pins 48 are a metal material such as steel, aluminum, alloys, and the like. In other embodiments, the pair of insertion pins 48 are a composite material such as plastic, polymer, and the like.

Further, the snap tab member 50 of the pin member 14 is configured to engage with the snap tab 42 of the hook housing 12. The snap tab member 50 includes a pair of guide members 60 that are configured to assist in guiding the snap tab member 50 into the snap tab member passage 43 of the hook housing 12. The snap tab member 50 includes a first notch 52 and a second notch 54 positioned below the first notch 52 in the system vertical direction (i.e., in the +/−Z-direction). The snap tab member 50 is configured to slidably engage with the with the hook housing 12 between a first position (e.g., in the assembled state where the snap tab 42 of the hook housing 12 engages with the second notch 54 of the snap tab member 50) and a second position (e.g., in the pre-assembled state where the snap tab 42 of the hook housing 12 engages with the first notch 52 of the snap tab member 50). It should be appreciated that in some embodiments, a protrusion 56 may extend outwardly from the snap tab member 50 between the first and second notches 52, 54 in the system longitudinal direction (i.e., in the +/−X direction). The protrusion 56 may be configured to assist the snap tab 42 in maintaining the first position (i.e., the assembled state) by not allowing the snap tab 42 from disengaging with the second notch 54.

Still referring to FIG. 1, the hook assembly 10 is illustrated in an unassembled state. As such, the pin member 14 is separated from the hook housing 12. In the unassembled state, the cavity 40 is unoccupied and the two pair of clip prongs 26 are not influenced by the distal end 58 of the pair of insertion pins 48.

Figure 3A:
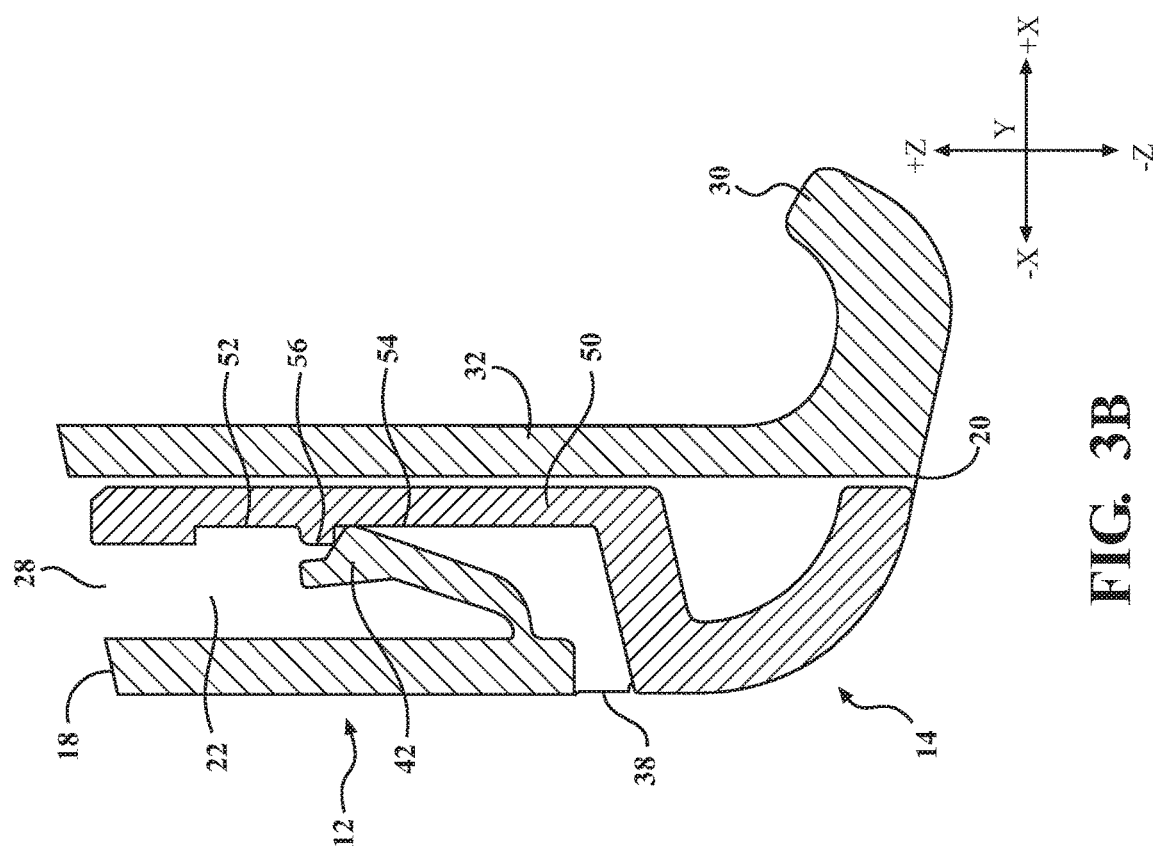
FIG. 3A schematically depicts a side cross-sectional view taken along the line 3-3 of the hook assembly of FIG. 1 in the pre-assembled state, according to one or more embodiments shown or described herein.
Figures 4A, 4B:
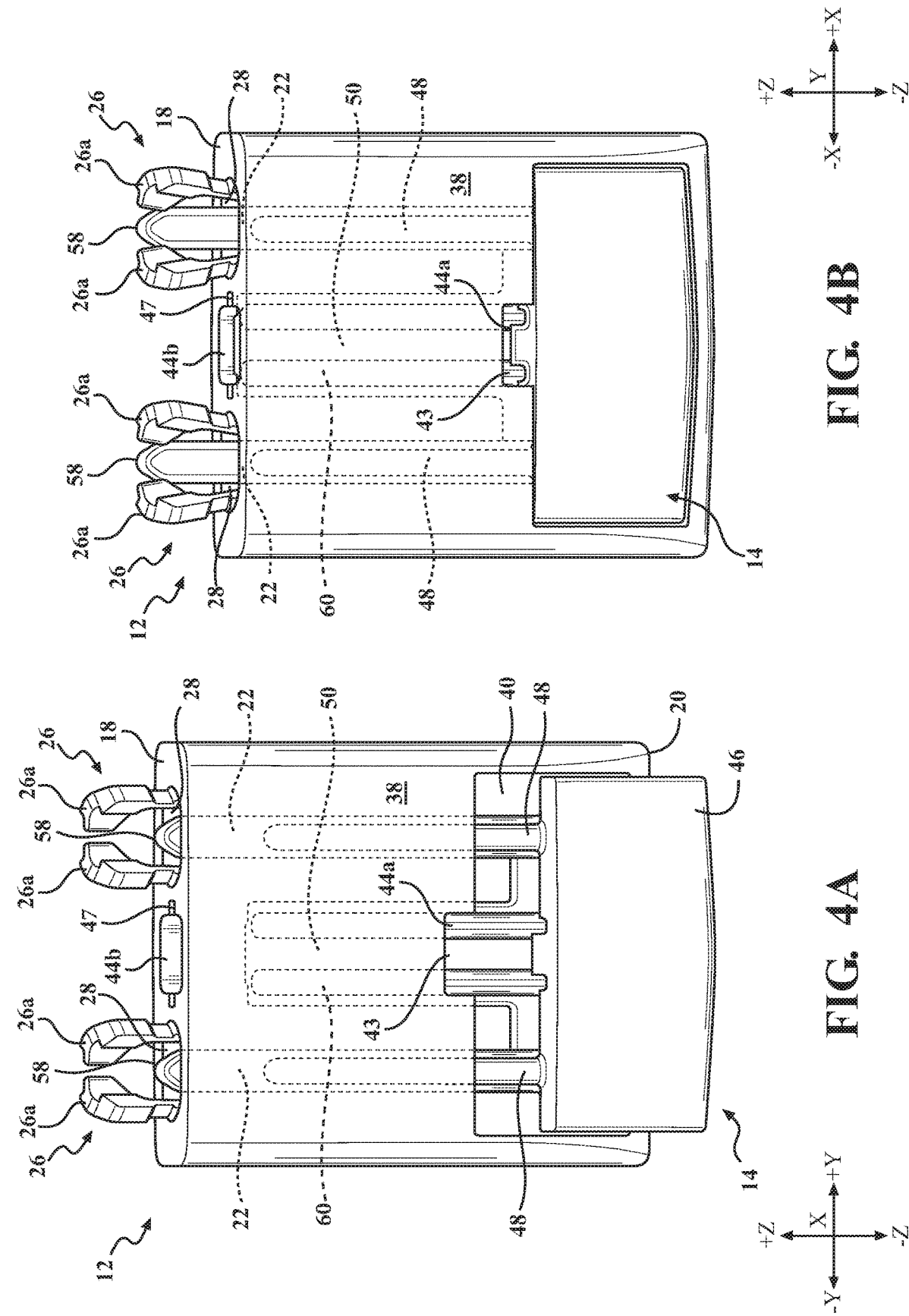
FIG. 4A schematically depicts a rear view of the hook assembly of FIG. 1 in a pre-assembly state, according to one or more embodiments shown or described herein.
FIG. 4B schematically depicts a rear view of the hook assembly of FIG. 1 in the assembled state, according to one or more embodiments shown or described herein.

Now referring to FIGS. 3A and 4A, the hook assembly 10 is illustrated in a assembled state. In the pre-assembled state, the pin member 14 is inserted into the cavity 40 of the hook housing 12 such that the snap tab 42 of the pin member 14 engages with the first notch 52 of the snap tab member 50, as best seen in FIG. 3A. In the pre-assembled state, the pair of insertion pins 48 are inserted into the plurality of interior channels 22, but the distal end 58 of each of the pair of insertion pins 48 do not extend beyond the openings 28 of the hook housing 12. As such, the two pair of clip prongs 26 are not influenced by the distal end 58 of the pair of insertion pins 48.

Figure 3B:
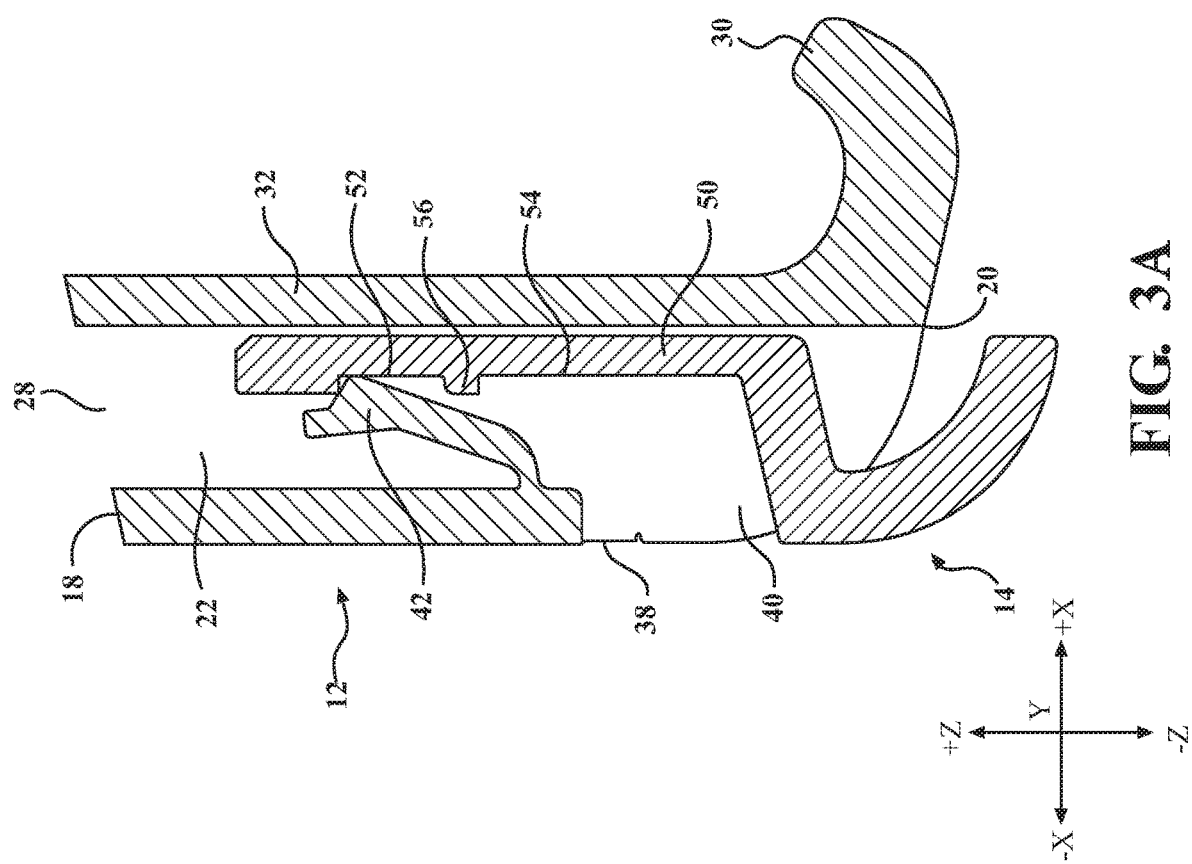
FIG. 3B schematically depicts a side cross-sectional view taken along the line 3-3 of the hook assembly of FIG. 1 in a assembly state, according to one or more embodiments shown or described herein.

Now referring to FIGS. 2, 3B and 4B, the hook assembly 10 is illustrated in the assembled state. In the assembled state, the pin member 14 is fully inserted into the cavity 40 of the hook housing 12 such that the snap tab 42 of the pin member 14 engages with the protrusion 56 and the second notch 54 of the snap tab member 50. As such, the pair of insertion pins 48 are extended through the plurality of interior channels 22 such that the distal end 58 of each of the pair of insertion pins 48 extends beyond the openings 28 of the hook housing 12 and makes contact with the prongs 26a of the two pair of clip prongs 26. In response to the axial force in the system vertical direction (i.e., in the +/−Z direction) applied to each pair of prongs 26a by the distal end 58 of the pair of insertion pins 48, each pair of prongs 26a flex, for example, in the system lateral direction (i.e., in the +/−Y direction), to secure the hook housing 12 to the vehicle 15. In particular, the hook housing 12 is secured to a vehicle body component 16 via a corresponding pair of openings 17 in the vehicle body component 16.

With reference to FIG. 2, in the assembled state, the top surface 18 of the hook housing 12 may be angled $\theta_1$ so as to match a mounting surface 24 of the vehicle body component 16. As such, in embodiments, it should be appreciated that the angle $\theta_1$ of the hook housing 12 is an oblique angle with respect to the X-axis and an axial direction of the pair of interior channels 22.

Now referring to FIGS. 1-2, 3A-3B, and 4A-4B, during the assembly process of installing the hook assembly 10 into the corresponding pair of openings 17 of the vehicle body component 16, it should be appreciated that the pin member 14 may be slidably attached to the hook housing 12 in the pre-assembled state prior to installation such that the distal end 58 and a portion of the pair of insertion pins 48 are within the plurality of interior channels 22 but do not extend beyond the openings 28 of the top surface 18 of the hook housing 12. It should be appreciated that the advantages of placing the hook assembly 10 into the pre-assembled state eliminates the hook housing 12 and/or the pin member 14 from being misplaced, dropped, and the like before and/or during the installation into the vehicle body component 16.

The hook assembly 10 is secured to the vehicle body component 16 by inserting the two pair of clip prongs 26 into corresponding openings 17 formed in the vehicle body component 16 in the clip prong insertion direction A1 (denoted by the dotted line in FIG. 2). The base portion 46, including the pair of insertion pins 48, is then seated into the hook housing 12 such that the pair of insertion pins 48 are fully inserted through the plurality of interior channels 22 at a pin insertion direction A2 (denoted by the dash-dot-dash line in FIG. 2). In response, each pair of prongs 26a are pushed outwardly, for example, in the system lateral direction (i.e., in the +/−Y direction), by the distal end 58 of the pair of insertion pins 48 making contact each of the pair of prongs 26a. That is, at least each distal end 58 of the pair of insertion pins 48 exits the opening 28 of the interior channel of the respective plurality of interior channels 22 and is positioned between the pair of prongs 26a of the respective two pairs of clip prongs 26. The snap tab 42 of the hook housing 12 engages with the second notch 54 of the snap tab member 50 to retain the pin member 14 to the hook housing 12 in the assembled state. The clip prongs insertion angle A1 is angled with respect to the pin insertion angle A2.

It should be appreciated that the clip prongs insertion angle A1 is offset or angled with respect to the pin insertion direction A2, denoted by $\theta_2$ in FIG. 2. In some embodiments, the angle $\theta_2$ denoting the angle difference between the clip prongs insertion angle A1 with respect to the pin insertion direction A2 is 12.7 degrees. In other embodiments, the angle $\theta_2$ may be a range from 10.0 degrees to 15.0 degrees. It should be appreciated that by having the top surface 18 of the hook housing 12 angled, the clip prongs insertion angle A1 is created, which is different or offset from the pin insertion angle A2. Accordingly, the amount of available space required for the mounting the hook assembly 10 into the vehicle body component 16 is modified such that the amount of space required by the hook assembly 10 is reduced for installation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hook assembly for mounting to a body component having a pair of openings, the hook assembly comprising:
    a pin member including a base portion, and a pair of insertion pins extending upwardly from the base portion; and
    a hook housing including a top surface, an opposite bottom surface, and a pair of interior channels extending between openings formed in the top surface and an opening formed in the bottom surface, a pair of clip prongs positioned at each opening of each one of the pair of interior channels at the top surface of the hook housing, and a hook member that extends outwardly from the hook housing,
    the hook housing is coupled to the body component by inserting the pair of clip prongs into the openings formed in the body component in a clip prong insertion direction, and the pair of insertion pins are inserted into the pair of interior channels in a pin insertion direction to secure the pin member and the hook housing to the body component, the pin insertion direction being different from the clip prong insertion direction.

2. The hook assembly of claim 1, wherein upon insertion of the pair of insertion pins, such that a distal end of each of the pair of insertion pins extend through the openings formed in the top surface of the hook housing, the pair of insertion pins engage the pair of clip prongs such that the pair of clip prongs are pushed outwardly to secure the hook housing and the pin member to the body component.

3. The hook assembly of claim 2, wherein the clip prong insertion direction is obliquely angled with respect to the pin insertion direction.

4. The hook assembly of claim 3, wherein the clip prong insertion direction is angled within a range of 10 degrees to 15 degrees with respect to the pin insertion direction.

5. The hook assembly of claim 4, wherein the clip prong insertion direction is angled at 12.7 degrees with respect to the pin insertion direction.

6. The hook assembly of claim 1, wherein:
    the hook housing further includes a front surface and an opposite back surface,
    the bottom surface and a portion of the back surface of the hook housing includes a cavity, the pin member is configured to slidably engages with the hook housing through the cavity.

7. The hook assembly of claim 1, wherein the hook housing includes a snap tab positioned between the pair of interior channels, and the pin member includes a snap tab member positioned between the pair of insertion pins, the snap tab of the hook housing being configured to engage with the snap tab member of the pin member to retain the pin member to the hook housing.

8. The hook assembly of claim 7, wherein the snap tab of the hook housing engages with the snap tab member of the pin member at a first position to retain the pin member to the hook housing in an assembled state in which the snap tab and the snap tab member are engaged such that the pin member is coupled to the hook housing and each distal end of the pair of insertion pins extend through the openings of the hook housing.

9. The hook assembly of claim 8, wherein a second position of the snap tab member of the pin member engages with the snap tab of the hook housing to retain the pin member to the hook housing in a pre-assembled state, wherein the snap tab and the snap tab member are engaged such that the pin member is coupled to the hook housing and each distal end of the pair of insertion pins do not extend through the openings of the hook housing.

10. A vehicle comprising:
a vehicle body component having a pair of openings;
a retractable sunshade having an opening and configured to move to an extended position;
a hook assembly configured for securing the retractable sunshade in the extended position, the hook assembly comprising:
a hook housing comprising:
a top surface, an opposite bottom surface, and a plurality of interior channels extending between the top surface and the bottom surface,
a pair of clip prongs positioned at the opening of each one of the plurality of interior channels at the top surface of the hook housing,
a snap tab positioned between the plurality of interior channels, and
a hook that extends outwardly from the hook housing to engage with the retractable sunshade,
a pin member comprising:
a base portion,
a pair of insertion pins extending upwardly from the base portion, and
a snap tab member provided between the pair of insertion pins,
wherein the hook assembly is secured to the vehicle body component by inserting the pair of clip prongs into the corresponding openings formed in the vehicle body component in a clip prong insertion direction,
wherein the pair of insertion pins are then inserted into each corresponding interior channel of the plurality of interior channels at a pin insertion direction such that the pair of clip prongs are pushed outwardly when the pin member is fully inserted into the hook housing such that a distal end of each insertion pin exits the opening of the respective interior channel and is positioned between a pair of prongs of the respective pair of clip prongs, the clip prong insertion direction is angled with respect to the pin insertion direction, and
wherein the snap tab of the hook housing engages with the snap tab member of the pin member at a first position to retain the pin member to the hook housing in an assembled state.

11. The vehicle of claim 10, wherein the clip prong insertion direction is obliquely angled with respect to the pin insertion direction.

12. The vehicle of claim 11, wherein the clip prong insertion direction is angled within a range of 10 degrees to 15 degrees with respect to the pin insertion direction.

13. The vehicle of claim 12, wherein the clip prong insertion direction is angled at 12.7 degrees with respect to the pin insertion direction.

14. The vehicle of claim 10, the hook housing further includes a front surface and an opposite back surface, the bottom surface and a portion of the back surface of the hook housing includes a cavity, the pin member is configured to slidably engages with the hook housing through the cavity.

15. The vehicle of claim 10, wherein a second position of the snap tab member of the pin member engages with the snap tab of the hook housing to retain the pin member to the hook housing in a pre-assembled state, wherein the snap tab and the snap tab member are engaged such that the pin member is coupled to the hook housing and each distal end of the pair of insertion pins do not extend through the opening of each one of the plurality of interior channels of the hook housing.

* * * * *

UNITED STATES PATENT AND TRADEMARK OFFICE
CERTIFICATE OF CORRECTION

PATENT NO. : 11,207,954 B2
APPLICATION NO. : 16/579023
DATED : December 28, 2021
INVENTOR(S) : Tsao et al.

It is certified that error appears in the above-identified patent and that said Letters Patent is hereby corrected as shown below:

In the Specification

In Column 4, Line(s) 57, delete "assembled" and insert --pre-assembled--, therefor.

Signed and Sealed this
Twenty-sixth Day of April, 2022

Katherine Kelly Vidal
*Director of the United States Patent and Trademark Office*